United States Patent
Holtzman et al.

(10) Patent No.: US 7,027,392 B2
(45) Date of Patent: Apr. 11, 2006

(54) METHOD AND APPARATUS FOR SCHEDULING PACKET DATA TRANSMISSIONS IN A WIRELESS COMMUNICATION SYSTEM

(75) Inventors: Jack Holtzman, San Diego, CA (US); Gwendolyn D. Barriac, Goleta, CA (US)

(73) Assignee: Qualcomm, Incorporated, San Diego, CA (US)

( * ) Notice: Subject to any disclaimer, the term of this patent is extended or adjusted under 35 U.S.C. 154(b) by 543 days.

(21) Appl. No.: 09/929,179

(22) Filed: Aug. 14, 2001

(65) Prior Publication Data

US 2003/0039213 A1 Feb. 27, 2003

(51) Int. Cl.
- H04J 1/16 (2006.01)
- H04J 3/16 (2006.01)
- H04J 3/22 (2006.01)
- H04J 3/14 (2006.01)
- H04Q 7/00 (2006.01)
- G01R 31/08 (2006.01)
- G09F 11/00 (2006.01)
- G08C 15/00 (2006.01)
- H04L 1/00 (2006.01)
- H04L 12/26 (2006.01)

(52) U.S. Cl. ............... 370/230; 370/328; 370/465
(58) Field of Classification Search ............ 370/230, 370/232, 234, 328, 235, 235.1, 395.4, 395.41, 370/399.42, 428–429, 464–465, 468

See application file for complete search history.

(56) References Cited

U.S. PATENT DOCUMENTS

| | | | | |
|---|---|---|---|---|
| 5,583,869 A | * | 12/1996 | Grube et al. | 370/347 |
| 6,411,617 B1 | * | 6/2002 | Kilkki et al. | 370/353 |
| 6,590,890 B1 | * | 7/2003 | Stolyar et al. | 370/349 |
| 2003/0012220 A1 | * | 1/2003 | Kim et al. | 370/455 |

FOREIGN PATENT DOCUMENTS

EP   1089500 A2   4/2001

OTHER PUBLICATIONS

Andrews, et al. "Providing Quality of Service Over a Shared Wireless Link" IEEE Communications Magazine 39(2): 150–154 (Feb. 2001).

Joshi, et al. "Downlink Scheduling in CDMA Data Networks" ACM Mobicom 2000, 12 pgs.

* cited by examiner

Primary Examiner—Frank Duong
Assistant Examiner—Kevin C. Harper
(74) Attorney, Agent, or Firm—Philip R. Wadsworth; Thien T. Nguyen

(57) ABSTRACT

A method (100) for scheduling packet data transmissions in a wireless communication system wherein a per-user Priority Function (PF) is calculated as a function of packet delay time of the user. When a given user has a packet delay time violating a threshold, the PF of the user is adjusted accordingly. In one embodiment, a delay function is applied to the PF calculation, wherein the delay function considers the average requested data rate for all users in the active set having pending data and the average data rate of a given user.

15 Claims, 4 Drawing Sheets

METHOD AND APPARATUS FOR SCHEDULING PACKET DATA TRANSMISSIONS IN A WIRELESS COMMUNICATION SYSTEM

REFERENCE TO CO-PENDING APPLICATIONS FOR PATENT

The present Application for Patent is related to "Method and Apparatus for Scheduling Packet Data Transmissions in a Wireless Communication System" by Leonid Razoumov et al., having application Ser. No. 09/728,239, filed Nov. 30, 2000, now issued as U.S. Pat. No. 6,847,629, assigned to the assignee hereof and hereby expressly incorporated by reference herein.

FIELD

The present invention relates to wireless data communication. More particularly, the present invention relates to a novel and improved method and apparatus for scheduling packet data transmissions in a wireless communication system.

BACKGROUND

In a wireless communication system, a base station communicates with multiple mobile users. Wireless communications may include low delay data communications, such as voice or video transmissions, or high data rate communications, such as packetized data transmissions. U.S. Pat. No. 6,574,211, entitled "METHOD AND APPARATUS FOR HIGH RATE PACKET DATA TRANSMISSION," issued Jun. 3, 2003 describes high rate packet data transmissions, and hereby expressly incorporated by reference.

Packet data transmissions are not required to be low latency transmissions, and therefore allow the base station flexibility in scheduling mobile user transmissions within a system. Once scheduled, the base station may transmit data to as little as a single mobile user during a given time period. In general, scheduling of packet data mobile users in a system has two goals. The first goal is to optimize the utilization of each channel. The second goal is to allocate transmissions to mobile users fairly. The two goals sometimes compete. For example, channel quality conditions and the amount of pending data for a given user may result in excessive time allocations to that user particularly at the expense of other users.

There is a need, therefore, for a fair method for scheduling packet data transmissions to mobile users that is channel-sensitive.

SUMMARY

The disclosed embodiments provide a novel and improved method for scheduling packet data transmissions in a wireless communication system. In one aspect, in a wireless communication system adapted for packet data transmissions, a method includes receiving rate request indicators for a plurality of mobile stations, calculating priority function values for the plurality of mobile stations in response to the rate request indicators, and scheduling transmissions to the mobile stations according to the priority function value.

According to another aspect, a wireless apparatus includes a priority factor calculation unit adapted to receive data rate requests from mobile stations and generate power factor values in response, and a scheduling unit coupled to the priority factor calculation unit, the scheduling unit adapted to schedule data transmissions.

According to still another aspect, a method for scheduling packet data transactions in a wireless communication system includes determining a pool of users, calculating a priority function of at least a portion of the pool of users, scheduling a first set of users having pending data transactions from the portion of the pool of users, receiving rate request indicators from the portion of the pool of users, and updating priority functions of the first set of users in response to the rate request indicators.

BRIEF DESCRIPTION OF THE DRAWINGS

The features, objects, and advantages of the presently disclosed method and apparatus will become more apparent from the detailed description set forth below when taken in conjunction with the drawings in which like reference characters identify correspondingly throughout and wherein.

DETAILED DESCRIPTION OF THE PREFERRED EMBODIMENTS

In an exemplary embodiment of the present invention, a base station of a spread-spectrum wireless communication system schedules packet data transmissions to mobile users based upon the instantaneous values of a per-user Priority Function (PF). The user scheduling priority is related to the PF value, wherein a high PF value indicates a high scheduling priority and a low PF value indicates a low priority. In one aspect, a method for determining PF values is based on a channel condition indicated by a Rate Request Indicator (RRI). The method also considers a fairness criteria dictated by the Quality Of Service (QOS) requirements. Such a method provides robust protection against non-zero buffer under-runs on the transmitter side. In one embodiment, the rate request indicator is a Data Rate Request (DRR). In another embodiment, the rate request indicator is Carrier-to-Interference (C/I) information. Alternate embodiments may implement other types of rate request indicators or predictors. In the exemplary embodiment, the base station calculates a Priority Function (PF) for the multiple mobile users. Each PF is a function of the rate request indicator and the projected throughput of a given mobile user. The PF values allow the base station to schedule active mobile units having pending data. The scheduling produces an approximately equal share of the allocated transmission time to the multiple mobile stations.

Scheduling allocation improves channel sensitivity by reducing adverse effects associated with assigned data rates. Actual data rate assignments provide quantized transmission rates. This results in a coarse adjustment of data rates within a system. Actual data rates may be truncated, or otherwise manipulated, to conform to the assigned and available data rates. By using a rate request indicator to determine a transmission data rate, the data rate is adjusted according to the actual requirements and operating environment of the system.

Figure 1:
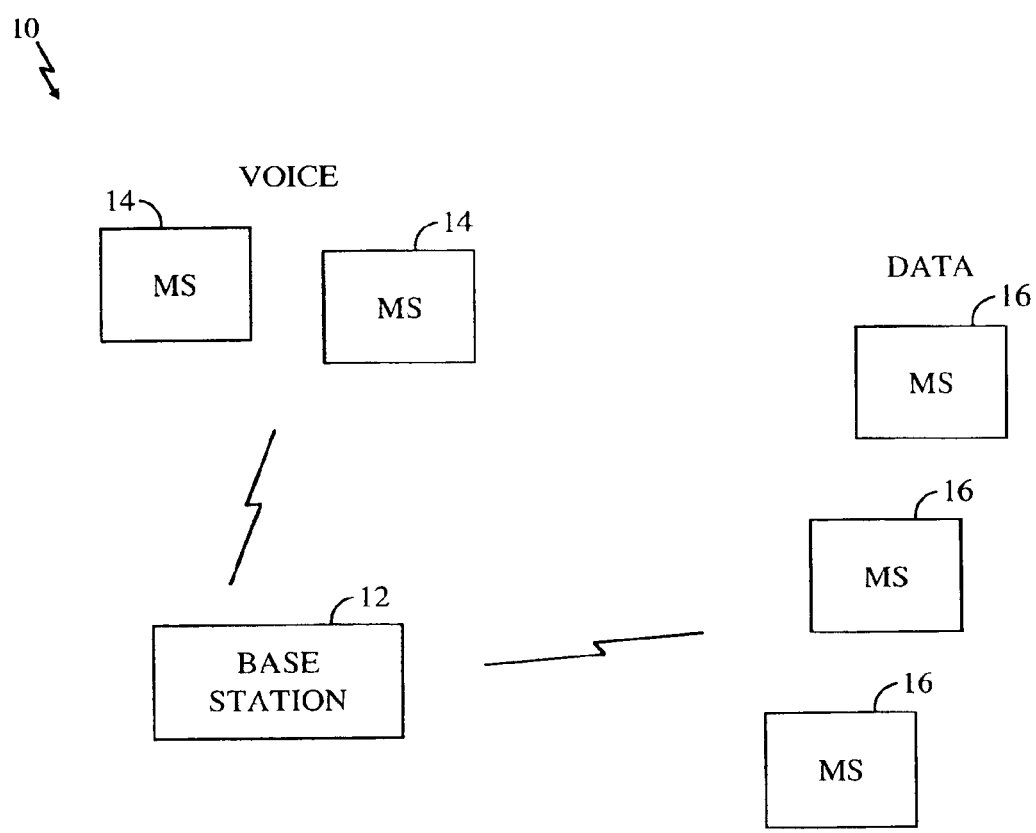
FIG. 1 illustrates in block diagram form a wireless communication system according to one embodiment.

In an exemplary embodiment illustrated in FIG. 1, a wireless communication system 10 includes a base station 12 that communicates with mobile stations 14 and mobile stations 16 via an air interface or radio link. The base station 12 processes separate transmissions for each of mobile stations 16. As illustrated, mobiles stations 14 are employing low delay data communication type services, such as voice communications, while mobile stations 16 are employing high rate packet data communications. Communications between base station 12 and mobile stations 14 are performed in real-time and therefore all active communications are performed simultaneously and concurrently. In contrast, packet data communications with mobile stations 16 may be scheduled, wherein communications to multiple mobile stations 16 are transmitted simultaneously at a given time. Alternate embodiments may allow concurrent transmissions to more than one of mobile stations 16 seeking to optimize channel utilization.

Figure 2:
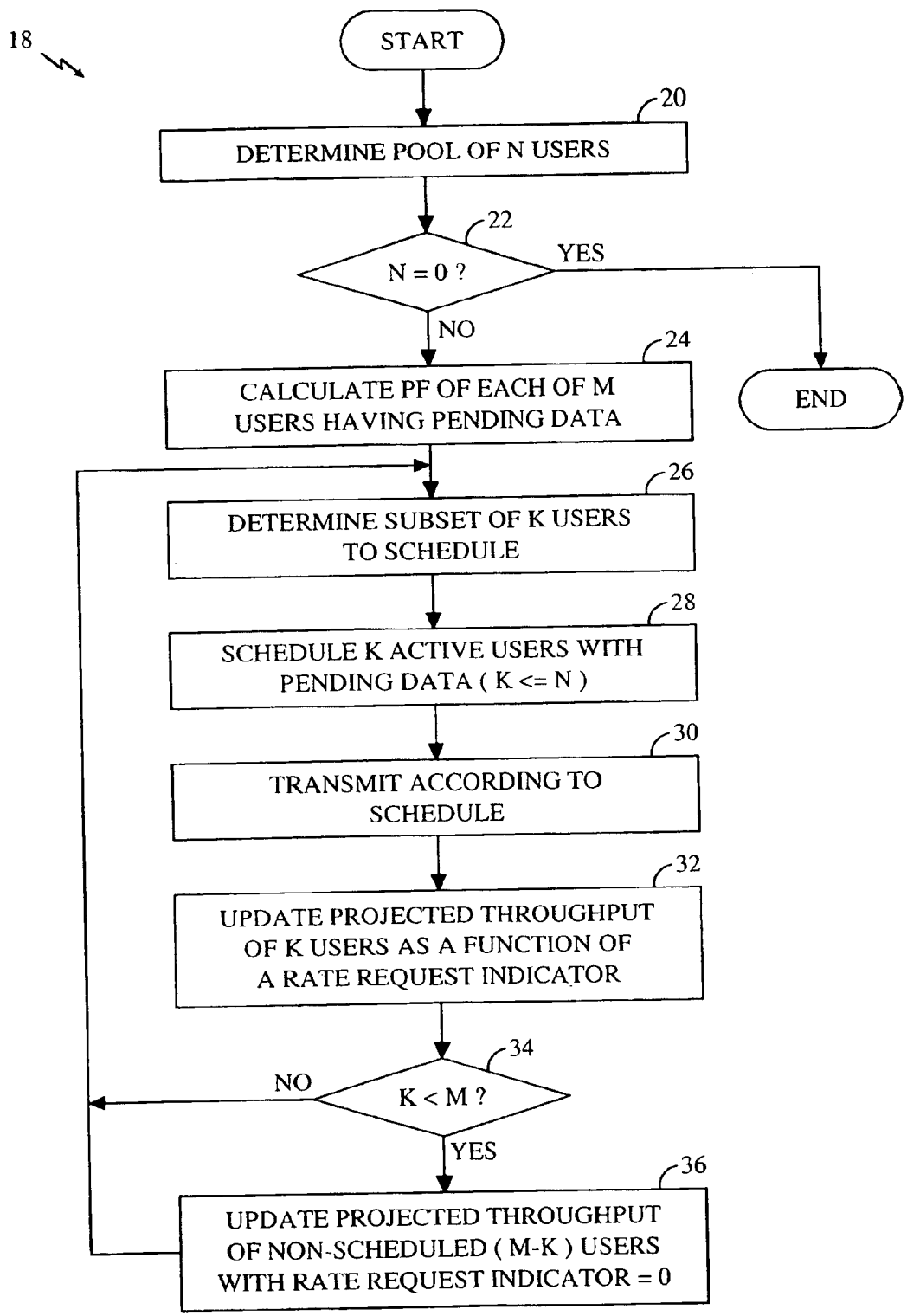
FIG. 2 illustrates in flow diagram form a method for scheduling packet data transmission in a system as in FIG. 1 according to one embodiment.

FIG. 2 illustrates a method 18 for scheduling mobile stations 16 within system 10. The process begins by determining a pool of active mobile users within system 10 at step 20. The total number of mobile stations 16, or users, in the pool is designated as "N." If N is equal to 0, at step 22, the process ends, else the process continues to step 24 to calculate a PF for each of a subset of "M" users within the pool, wherein the M active users have data pending. The PF calculation is performed according to the following equation:

$$PF(j) = \frac{DRR(j)}{T'(j)}, \text{ for } j = 1, \ldots, M, \quad (1)$$

wherein j is a user index corresponding to the M active users with pending data. In the exemplary embodiment, a rate request indicator is implemented as DRR(j), the Data Rate Request (DRR) received from user j, for j=1, ..., M. Having the channel-sensitive rate request indicator in the numerator provides proportionality to the scheduling of users in system 10. The rate request indicator is then divided by a projected throughput associated with each user j, T'(j). The actual throughput of each user, j, may be represented as T(j), although the actual throughput is not used directly in this calculation of Equation (1).

From the subset of M active users with data pending, at step 26, a further subset is determined of "K" users to be scheduled for transmission. In the exemplary embodiment, the subset of K users is determined according to system configuration and a predetermined scheduling policy. Often K=1, or K is constrained to a single user. However, K may be any number less than or equal to M. Based on the calculated PF values, the base station schedules "K" users at step 28. Note that the K scheduled users constitute a subset of the N active users, i.e., (K≦M≦N ). The base station 12 then transmits packet data transmissions at step 30 according to the schedule of step 28. Transmission involves determination of transmission power, power control, data rate, modulation, and other parameters of transmission. Note that concurrently, the base station 12 may be transmitting low latency transmissions to mobile stations 14.

At step 32, the base station 12 updates each projected throughput, T', for each of the K scheduled users as a function of a corresponding rate request indicator received from each scheduled user. The following formula describes the T' update calculation for scheduled users according to the exemplary embodiment:

$$T'(j,n+1) = (1-\alpha) \cdot T'(j,n) + \alpha \cdot DRR(j), \quad (2)$$

wherein α is a time constant of a smoothing filter used for scheduling, for digital samples having index n. In one embodiment, the time constant may be related to the targeted QOS and/or velocity of each mobile station 16. In the exemplary embodiment, a rate request indicator is implemented as DRR(l), the Data Rate Request (DRR) received from user l, for l=1, ..., N. Having the channel-sensitive rate request indicator in the numerator provides proportionality to the scheduling of users in system 10. The rate request indicator is then divided by a projected throughput associated with each user j, T'(j). The actual throughput of each user, j, may be represented as T(j), although the actual throughput is not used directly in this calculation of Equation (1). Rather, the scheduling method makes a prediction or projection of the throughput of each user based on the rate request indicator received from that user. The rate request indicator may be the DRR transmitted via a Data Rate Control (DRC) channel, wherein the user determines a quality of the transmission channel and determines a corresponding data rate to request. The quality of the transmission channel may be a C/I measure of transmissions received by the user, wherein a corresponding DRR is associated with the C/I ratio, such as via a lookup table. In one embodiment, the user sends the C/I ratio to the base station 12 and the base station 12 determines a data rate based on the C/I. Alternately, the user may determine the data rate to request based on errors in transmitted data received by the user. The user may use a variety of methods to determine a data rate to request of the base station. Similarly, the user may implement a variety of rate request indicators for requesting a data rate from the base station. Still further, in one embodiment, different mobile stations 16 implement different rate request indicators.

If K<M at step 34 processing continues to step 36 to update each T' for non-scheduled users within the pool of N active users, i.e., users not included in the M scheduled users. The projected throughput calculation for non-scheduled users is given as:

$$T'(i,n+1) = (1-\alpha) \cdot T'(i,n), \quad (3)$$

for i=1, ..., (M-K). Here the rate request indicator is assumed to be zero for calculation of the projected throughput used for updating each PF associated with non-scheduled users. Processing then returns to step 26 wherein the updated PF values are used to continue scheduling any users that still have pending data.

The exemplary embodiment updates the PF values for each user as if each mobile station 16 always has sufficient amount of pending data, and that the rate requested by each mobile station 16 is realizable. Therefore, the scheduling sequence generated by the PF computed as in Equations (1)–(3) is not sensitive to any unpredictable states of the transmission buffers as long as a buffer has at least one bit of data to send.

Figure 3:
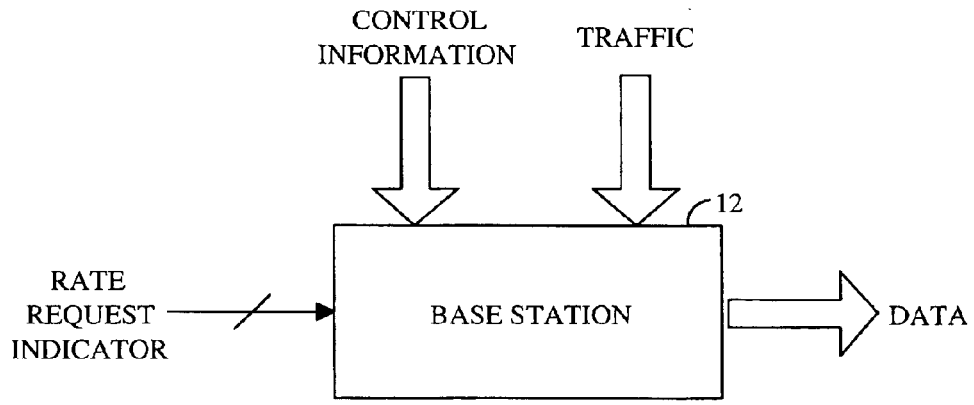
FIG. 3 illustrates in block diagram form a base station as in FIG. 1 according to one embodiment.

FIG. 3 further details base station 12, including signals received, processed, and transmitted. As illustrated, base station 12 receives a rate request indicator, such as DRR or C/I, from multiple mobile stations 16. Control information is received from at least the mobile stations 16, and also may be received from a central controller, such as a Base Station Controller (BSC) (not shown). The base station receives traffic, referred to as "backbone traffic," from a network (not shown), such as the Internet. In response to these signals, base station 12 transmits data to mobile stations 16.

Figure 4:
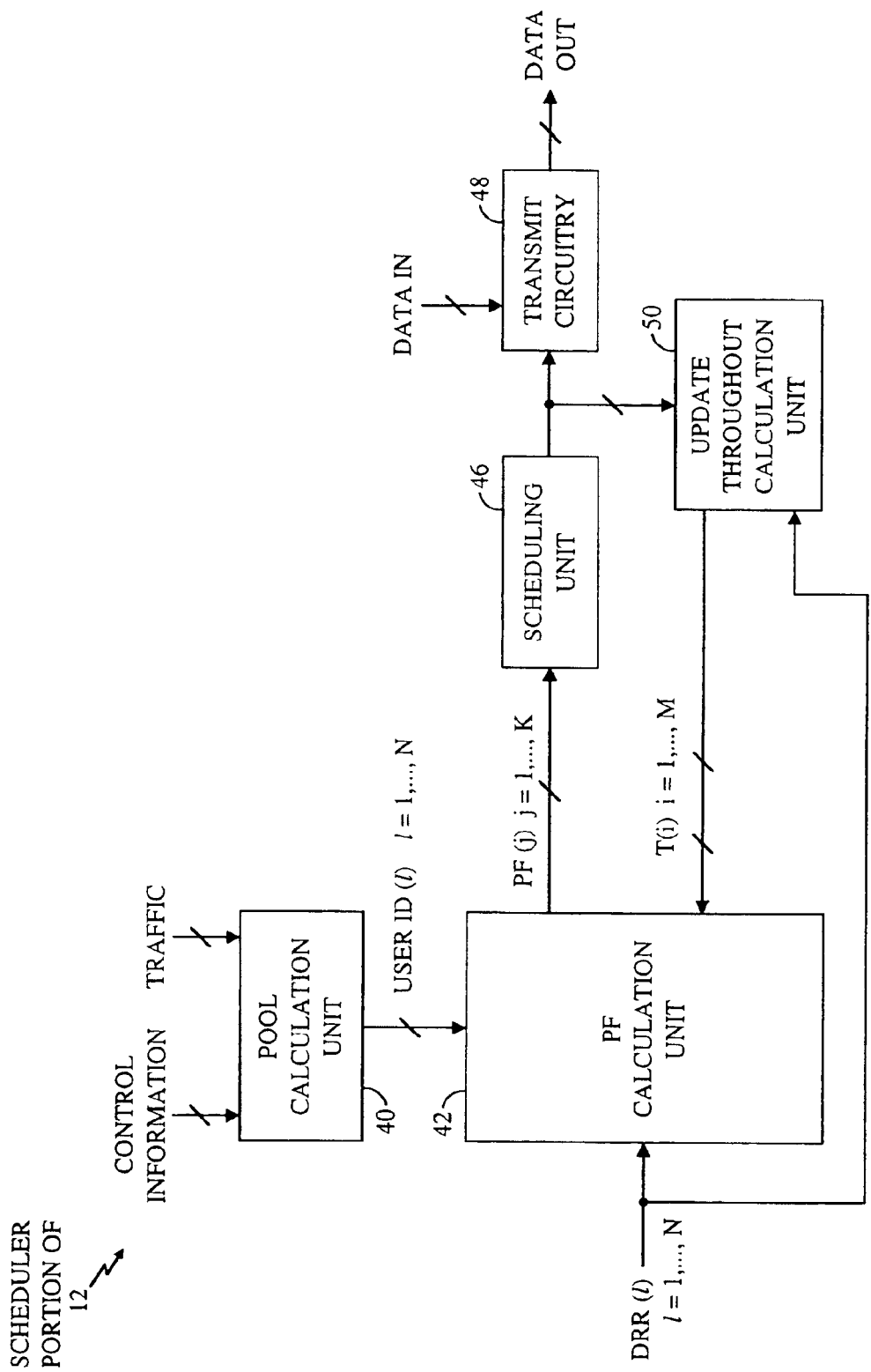
FIG. 4 illustrates in block diagram form a portion of a base station as in FIG. 3 according to one embodiment.

FIG. 4 further details a scheduler portion of base station 12. Base station 12 includes a pool calculation unit 40 for determining the number and identification of mobile stations 16 active at a given time. Active mobile stations 16 communicate with base station 12, but may not have any pending data transactions. The pool calculation unit 40 receives control information from the mobile stations 16 and the BSC (not shown), and also receives traffic from a network (not shown). In response, the pool calculation unit 40 provides user identification information, User ID(l) for l=1, ..., N, to a PF calculation unit 42. The user identification information is provided for all N active users in system 10.

The PF calculation unit 42 receives data rate request indicators from the mobile stations 16, such as DRR(l). The PF calculation unit 42 uses the rate request indicator to determine a PF for each user according to Equation (1). The PF(j) for all users having pending data j=1, ..., K are provided to a scheduling unit 46. The scheduling unit 46 determines a schedule among the various users associated with PF(j). The scheduling unit 46 provides the schedule information to transmit circuitry 48. DATA IN is also provided to transmit circuitry 48, which transmits the data according to the schedule information to produce DATA OUT. The schedule information is also provided to a calculation unit 50 which updates the projected throughput of the active N users. The scheduled users are updated according to Equation (2), while the non-scheduled users are updated according to Equation (3). For updating the projected throughput values, the calculation unit 50 receives rate request indicators for mobile stations 16. The updated projected throughput values for the subset of M users with pending data are then provided back to the PF calculation unit 42 to update the PF values. The calculation unit 50 includes a smoothing filter, such as an Infinite Impulse Response (IIR) filter. The tap coefficients for the smoothing filter are configurable.

In one example, a mobile station 16 has a velocity of 3 km/hr and experiences a doppler frequency, $f_{doppler}$, of 5.4 Hz. Projected throughput(s) are subject to IIR smoothing filtering according to Equations (2) and (3) with a time constant, $T_W$, given as approximately, is 2 sec. The IIR filter tap coefficient, $\alpha$, is related to time constant $T_W$ by a relation given as:

$$\alpha = \frac{1}{T_W \cdot \left(\frac{\text{frames}}{\text{sec.}}\right)}, \quad (4)$$

resulting in a time constant of $\frac{1}{100}$ given a frame duration of 20 msec, i.e., 50 frames/sec. In general calculation of $\alpha$ involves first determining a quality of service for the transmissions reflecting a fairness constraint wherein each mobile station 16 is allocated a time fraction within a predetermined tolerance. The calculation then optimizes $\alpha$ to achieve optimum real system throughput.

In an alternate embodiment, the proportional fair algorithm implements a fairness criteria that incorporates a delay term. Specifically, the delay is measured at the base station, from the time a data packet arrives until the data is transmitted from the BS to a user or MS. The delay may be measured until the start of the transmission or the end of the transmission. The delay effectively measures the time data is maintained at the BS before transmission. The data may be stored in a queue or other memory storage device at the BS 12 (not shown).

Generally, the proportional fair algorithm maintains a balance between maximizing throughput among a set of users and fairly allocating throughputs to individual users. The algorithm does not, however, guarantee satisfaction of a specific delay requirement for an individual user. By modifying the proportional fair priority function, PF, to include a delay sensitive term the result provides scheduling consistent with the delay requirement(s). Note that the delay requirements are typically specified by an operating standard.

In an exemplary embodiment, the delay requirements of the users in the system are provided as a function of time (e.g. d given in seconds) to BS 12 a priori. The BS then assigns a time delay threshold value, $\tau$, to each user. Specifically, the BS stores the values $\tau_i$ for users i=1, ... N, wherein N is the total number of users at a given time. Calculating the traditional proportional fair priority of a user is given as:

$$\frac{DRC}{T} \quad (5)$$

wherein DRC is the data rate sustainable by a given MS, and T is the throughput of the user. By modifying Equ. (5) to:

$$\frac{DRC}{T} g(d) \quad (6)$$

the PF calculation incorporates a delay function g(d) which is a function of the user's delay.

In this way, the scheduling method gives priority to a user when his delay is above a predetermined threshold value by application of Equ. (6). When the delay is reduced below the threshold value, the user's priority is calculated as in Equ. (5).

Figure 5:
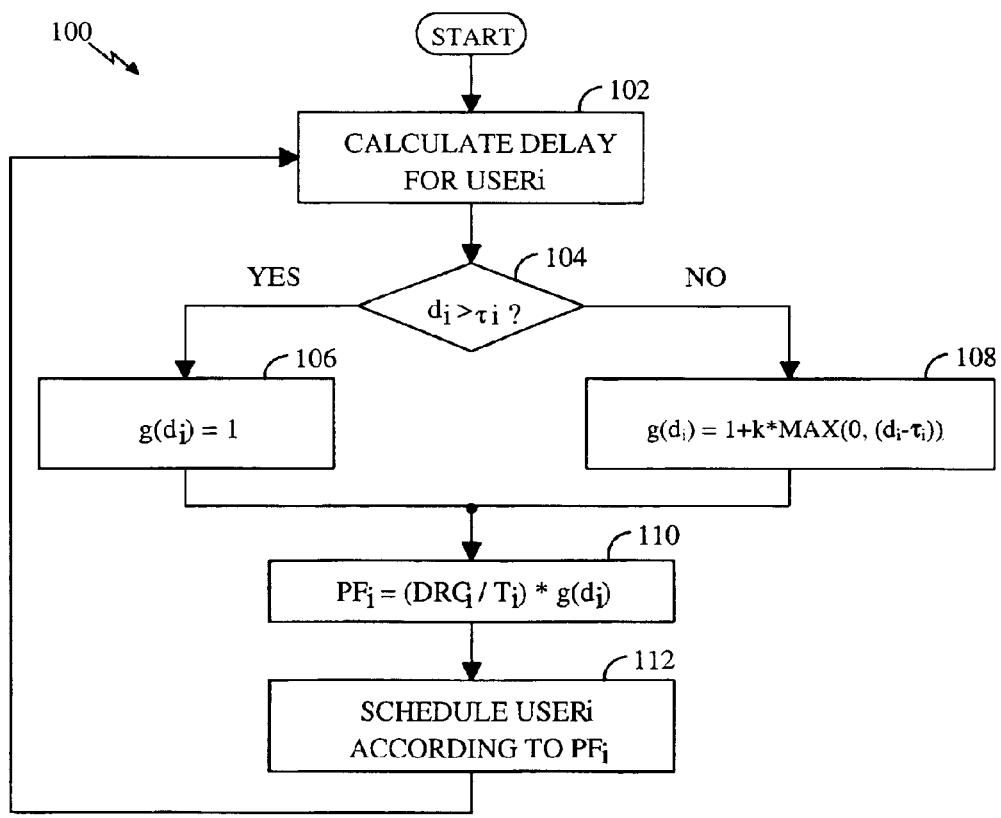
FIG. 5 illustrates a method 100 of scheduling users in a packetized data transmission system.

FIG. 5 illustrates a method 100 of scheduling users in a packetized data transmission system. The process calculates the delay for a user i, specified as $d_i$ at step 102. The delay $d_I$ is then compared to a threshold $\tau_i$. The threshold $\tau_i$ is specific to user i. Alternate embodiments may implement a single threshold for all users. Additionally, the threshold $\tau_i$ may be a dynamic threshold that is updated during operation of the system. If the user delay is greater than the threshold at decision diamond 104, the process calculates a delay function g(d) for di at step 106, wherein the function is defined as:

$$g(d_i)=1+k*MAX(0, (d_i-\tau_i)). \quad (7)$$

If the user delay is less than or equal to the threshold, the delay function g(d) is calculated at step 106 and is given as:

$$g(d_i)=1. \quad (8)$$

The process then applies a PF at step 110 using the delay function calculated in step 106 or 108. The PF is given as:

$$PF_i=(DRC_i/T_i)*g(d_i). \quad (9)$$

At step 112 the process schedules user I according to PFi.

Alternate embodiments may implement any of a variety of delay functions consistent with the requirements, performance, and extent of a given communication system. In an alternate embodiment, the delay function is defined as:

$$g(d_i)=1+k*MAX(0, f(d_i-\tau_i)), \quad (10)$$

wherein $f( )$ may represent an increasing function of the delay, or specifically, an increasing function of $(d_i-\tau_i)$.

Another alternate embodiment implements the delay function as defined by the following equations:

$$g(d_i)=1, \text{ for } d_i<\tau_i; \text{ and} \quad (11)$$

$$g(d_i)=DRC_{MAX}/DRC_{AVE}, \text{ for } d_i \geq \tau_i, \quad (12)$$

wherein $DRC_{MAX}$ is a maximum value of the DRCs for all users, and $DRC_{AVE}$ is an average value for the DRC of user i. The delay function of Equations (11) and (12) adjusts the PF of a given user as a function of the delay of that user with respect to the other users. Therefore, if the average requested data rate, i.e., DRC, of user i is substantially less than the maximum DRC over all users in the active set having pending data and if the user is experiencing a delay violating the threshold, the user i will receive a priority bump up.

In still another embodiment. The PF of Equ. (5) is modified to adjust priority as a function of throughput instead of delay, wherein the PF is calculated as:

$$\frac{DRC}{T} g(T_i) \quad (13)$$

incorporating a throughput function $g(T_i)$. The throughput function reflects the throughput of user i. Specifically, if the throughput $T_i$ is greater than a throughput threshold, then $$g(T_i)=1; \text{ and} \quad (14)$$

if the throughput $T_i$ is less than or equal to the throughput threshold, then $$g(T_i)=DRC_{MAX}/DRC_{AVE}. \quad (15)$$

In this way, the user priority is modified in response to throughput received. When the throughput is too low, i.e., at or below the threshold, the PF is bumped up. Else, the priority function is calculated as given in Equ. (5). Therefore, if the average requested data rate, i.e., DRC, of user i is substantially less than the maximum DRC over all users in the active set having pending data and if the user is experiencing a throughput violating the throughput threshold, the user i will receive a priority bump up.

Further, alternate embodiments may implement a variety of delay functions, such as those specified in "Providing Quality of Service over a Shared Wireless Link" by Matthew Andrews, et al., IEEE Communications Magazine, February 2001, pp. 150–154, which is hereby expressly incorporated by reference.

Thus, a novel and improved method and apparatus for scheduling packet data transmissions in a wireless communication system has been described. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Still another embodiment may implement a delay function, such as specified in "Downlink Scheduling in CDMA Data Networks" by Niranjan Joshi, et al., ACM Mobicom 2000 and which is hereby expressly incorporated by reference.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, or state machine. The software modules could reside in RAM memory, flash memory, ROM memory, EPROM memory, EEPROM memory, registers, hard disk, a removable disk, a CD-ROM, or any other form of storage medium known in the art. The processor may reside in an ASIC (not shown). The ASIC may reside in a telephone (not shown). In the alternative, the processor may reside in a telephone. The processor may be implemented as a combination of a DSP and a microprocessor, or as two microprocessors in conjunction with a DSP core, etc.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication system adapted for packet data transmissions, the system having at least one mobile station with pending data at a transmitter, a method comprising:

calculating a packet delay time for a first receiver of the at least one mobile station with pending data;

comparing the packet delay time to a first threshold;

if the packet delay time violates the first threshold, calculating a first delay term;

calculating a priority function for the first receiver using the first delay term; and scheduling transmissions to the receiver according to the priority function, wherein a packet delay time function is calculated as:

g(d)=DRCMAX/DRCAVE for packet delay time requirement greater than the first threshold, wherein DRCMAX is a maximum of DRC values for receivers in an active set of the transmitter, and wherein DRCAVE is an average DRC value for the first receiver, wherein DRC is a data rate associated with at least one mobile station and wherein g(d) is a packet delay time function.

2. In a wireless communication system adapted for packet data transmissions, a method comprising:

identifying a user having a packet delay higher than a threshold; and adjusting the priority of the user while the packet delay is higher than the threshold, the adjusting including:

calculating a packet delay time for the user;

comparing the packet delay time to a first threshold;

if the packet delay time violates the first threshold, calculating a first delay term;

calculating the priority for the user using the first delay term; and scheduling transmissions to the user according to the priority, and wherein the first delay term is calculated according to one of:

$g(d)=1+k*MAX(0, (d_i-\tau_i))$ for packet delay time requirement greater than the first threshold, wherein k is an integer, $d_i$ is a delay time requirement of an $i^{th}$ mobile station, and $\tau_i$ is a threshold associated with the $i^{th}$ mobile station; and $g(d)=DRCMAX/DRCAVE$ for packet delay time requirement greater than the first threshold, wherein DRCMAX is a maximum of DRC values for receivers in an active set of the transmitter, and wherein DRCAVE is an average DRC value for the first receiver, wherein DRC is a data rate associated with at least one mobile station and wherein g(d) is a packet delay time function.

3. The method of claim 2, wherein the threshold is updated during operation of the system.

4. The method of claim 2, wherein a single threshold is used for all mobile stations in the system.

5. The method of claim 2, wherein at least two mobile stations in the system are associated with respective thresholds.

6. In a wireless communication system adapted for packet data transmissions, a computer executing logic comprising:

identifying a user having a throughput higher than a threshold; and adjusting the priority of the user while the packet delay is higher than the threshold, the adjusting including:

calculating a packet delay time for the user;

comparing the packet delay time to a first threshold;

if the packet delay time violates the first threshold, calculating a first delay term;

calculating the priority for the user using the first delay term; and scheduling transmissions to the user according to the priority, and wherein the first delay term is calculated according to one of:

$g(d)=1+k*MAX(0, (d_i-\tau_i))$ for packet delay time requirement greater than the first threshold, wherein k is an integer, $d_i$ is a delay time requirement of an $i^{th}$ mobile station, and $\tau_i$ is a threshold associated with the $i^{th}$ mobile station; and $g(d)=DRCMAX/DRCAVE$ for packet delay time requirement greater than the first threshold, wherein DRCMAX is a maximum of DRC values for receivers in an active set of the transmitter, and wherein DRCAVE is an average DRC value for the first receiver, wherein DRC is a data rate associated with at least one mobile station and wherein g(d) is a packet delay time function.

7. The system of claim 6, wherein the threshold is updated during operation of the system.

8. The system of claim 6, wherein at least two mobile stations in the system are associated with respective thresholds.

9. The system of claim 6, wherein a single threshold is used for all mobile stations in the system.

10. In a wireless communication system adapted for packet data transmissions, the system having at least one mobile station with pending data at a transmitter, a method comprising:

calculating a packet delay time for a first receiver of the at least one mobile station with pending data;

comparing the packet delay time to a first threshold;

if the packet delay time violates the first threshold, calculating a first delay term;

calculating a priority function for the first receiver using the first delay term; and scheduling transmissions to the receiver according to the priority function, wherein the first delay term is calculated as:

$g(d)=1+k*MAX(0, (d_i-\tau_i))$ for packet delay time requirement greater than the first threshold, wherein k is an integer, $d_i$ is a delay time requirement of an $i^{th}$ mobile station, and $\tau^i$ is a threshold associated with the $i^{th}$ mobile station.

11. The method of claim 10, wherein the threshold is updated during operation of the system.

12. The method of claim 10, wherein a single threshold is used for all mobile stations in the system.

13. The method of claim 10, wherein at least two mobile stations in the system are associated with respective thresholds.

14. A base station comprising:

means for receiving, from a mobile user, a user packet delay requirement;

means, responsive to the means for receiving, for establishing a priority of the user based at least in part on the user packet delay requirement, the means for establishing a priority including means for calculating a packet delay time for the mobile user, means for comparing the packet delay time to a first threshold, if the packet delay time violates the first threshold, means for calculating a first delay term, means for calculating the priority for the mobile user using the first delay term; and means for scheduling transmissions to the mobile user according to the priority, wherein a packet delay time function is calculated as $g(d)=DRCMAX/DRCAVE$ for packet delay time requirement greater than the first threshold, wherein DRCMAX is a maximum of DRC values for receivers in an active set of the transmitter, and wherein DRCAVE is an average DRC value for the first receiver, wherein DRC is a data rate associated with at least one mobile station and wherein g(d) is a packet delay time function.

15. In a wireless communication system adapted for packet data transmissions, a computer executing logic comprising:

identifying a user having a packet delay requirement;

comparing the packet delay requirement to a threshold;

if the packet delay time violates the threshold, calculating a first delay term;

calculating a priority function for the first receiver using the first delay term; and scheduling transmissions to the receiver according to the priority function, wherein a packet delay time function is calculated as:

$g(d)=DRCMAX/DRCAVE$ for packet delay time requirement greater than the threshold, wherein DRCMAX is a maximum of DRC values for receivers in an active set of the transmitter, and wherein DRCAVE is an average DRC value for the first receiver, wherein DRC is a data rate associated with at least one mobile station and wherein g(d) is a packet delay time function; and adjusting the priority of the user based on the comparison.

* * * * *